US006743770B2

(12) United States Patent
Bell et al.

(10) Patent No.: US 6,743,770 B2
(45) Date of Patent: Jun. 1, 2004

(54) NUTRITIONAL SUPPLEMENT FOR THE MANAGEMENT OF STRESS

(75) Inventors: Stacey J. Bell, Belmont, MA (US); Judith Shabert, Brookline, MA (US)

(73) Assignee: Functional Foods, Inc., Belmont, MA (US)

( * ) Notice: Subject to any disclaimer, the term of this patent is extended or adjusted under 35 U.S.C. 154(b) by 0 days.

(21) Appl. No.: 09/783,709

(22) Filed: Feb. 14, 2001

(65) Prior Publication Data

US 2002/0147152 A1 Oct. 10, 2002

(51) Int. Cl.[7] .......... A61K 31/35

(52) U.S. Cl. .......... 514/2; 514/23; 514/161; 514/277; 514/356; 514/419; 424/195.1; 424/725

(58) Field of Search .......... 424/195.1, 725; 514/188, 561

(56) References Cited

U.S. PATENT DOCUMENTS

| | | | | |
|---|---|---|---|---|
| 4,853,377 A | | 8/1989 | Pollack | |
| 5,968,896 A | * | 10/1999 | Bell | 514/2 |
| 6,132,724 A | | 10/2000 | Blum | |

OTHER PUBLICATIONS

Markus, Am.J. Clin. Nutr. 2000; 71:1536–44.*

Smith, A., et al., "The Influence of Meal Composition on Post–lunch Changes in Performance Efficiency and Mood", *Appetite, 10*:195–203 (1988).

Gonder–Frederick, L., et al., "Memory Enhancement in Elderly Humans: Effects of Glucose Ingestion", *Physiol. & Behav., 41*:503–504 (1987).

Ludwig, D.S., et al., "High Glycemic Index Foods, Overeating, and Obesity", *Pediatrics, 103*:1–6 (1999).

Cangiano, C., et al., "Eating Behavior and Adherence to Dietary Prescriptions in Obese Adult Subjects Treated with 5–Hydroxytryptophan", *J. Clin. Nutr., 56*:863–867 (1992).

Marcus, C.R., et al., *Am. J. Clin. Nutr., 71*:1535–1544 (2000).

Marriot, B.M. (Ed.), Food Components to Enhance Performance, Washington, D.C.: National Academy Press; Committee on Military Nutrition and Research, Conclusions and Recommendations,47–61 (1994).

Durlach, P.J., "The Effects of a Low Dose of Caffeine on Cognitive Performance", *Phychopharmacology, 140*:116–119 (1998).

* cited by examiner

*Primary Examiner*—Brenda Brumback
*Assistant Examiner*—Roy Teller
(74) *Attorney, Agent, or Firm*—Hamilton, Brook, Smith & Reynolds, P.C.

(57) ABSTRACT

A nutritional supplement to be incorporated into the diet of an individual under stress (e.g., chronic stress) is described, comprising a low-glycemic-index carbohydrate, alpha lactalbumin-enriched whey protein, fat, caffeine and a source of 5-hydroxytryptophan (5-HTP). The supplement provides active food-grade ingredients to improve the management of stress and symptoms associated therewith.

19 Claims, No Drawings

NUTRITIONAL SUPPLEMENT FOR THE MANAGEMENT OF STRESS

BACKGROUND OF THE INVENTION

Physiologic responses to all stresses are the same; only the intensity of the response and whether or not any given response will be evoked are highly individual. Acute stress, such as that resulting from a trauma, robbery, or loud noise produces a physiologic response that quickly disappears, after which the body returns to its normal, unstressed state. Chronic stress, caused for example by a divorce, an unpleasant boss, or lack of money, is more insidious; the physiologic response endures and the body fails to return to the baseline state. Being in a continuous state of stress makes one feel unwell, partly because the mechanisms that ordinarily help overcome stress become exhausted.

Stress is a state of disharmony which can be corrected by neural pathways, which mediate alertness, cognition and focused attention. A peripheral response occurring simultaneously is the redirection of energy, which allows for oxygen and nutrients to be directed to the central nervous system. Symptoms classically seen in stress occur, such as increases in heart rate, blood pressure, sweating, metabolic rate and peristaltic activity. Thus there is a need for dietary intervention to alleviate stress and symptoms associated therewith.

SUMMARY OF THE INVENTION

The invention relates to a nutritional supplement that can help with the management of stress. The nutritional supplement comprises a low-glycemic-index carbohydrate source, a source of protein, a source of fat, a source of caffeine and a source of 5-hydroxytryptophan (5-HTP). In preferred embodiments, the nutritional supplement comprises, for an about 25 grams to about 100 grams serving, from about 1 to about 100 grams carbohydrate (e.g., one or more low-glycemic-index carbohydrates that may further provide a source of dietary fiber), from about 1 to about 100 grams protein (which includes alpha lactalbumin-enriched whey protein), from about 1 to about 50 grams fat, from about 1 to about 600 mg caffeine and from about 1 mg to about 900 mg 5-HTP. The ranges used herein are based upon a single serving, where two servings are recommended per day. Vitamins and minerals in amounts recommended daily to supplement the diet can also be optionally added.

The nutritional supplement can be made in a variety of forms, such as pharmaceutical compositions (e.g., tablet, powder, suspension, liquid, capsule, gel), nutritional beverages, puddings, confections (i.e., candy), ice cream, frozen confections and novelties, or non-baked, extruded food products such as bars. In another embodiment, the ingredients of the nutritional supplement can be administered separately, such as by incorporating certain components (e.g., bitter tasting ones) into a capsule or tablet and the remaining ingredients are provided as a powder or nutritional bar. The preferred form of the nutritional supplement is a liquid (e.g., nutritional beverage) or a nutritional bar, such as a non-baked, extruded snack bar. The supplement can be formulated for single or multiple daily administration, preferably twice daily, taken as a breakfast replacement and as a mid-afternoon snack to modulate stress and mood which can be impaired by foods consumed at lunch.

The invention further pertains to therapeutic methods for managing stress in individuals in need thereof. The nutritional supplement can be administered to an individual to relieve stress, reduce the risk of chronic conditions of stress, enhance immune function, improve cognitive performance, promote satiety and weight loss, reduce cortisol, increase brain serotonin and improve mood.

DETAILED DESCRIPTION OF THE INVENTION

The invention relates to a nutritional supplement, which contains active ingredients to relieve stress in individuals subjected to stress, particularly chronic stress. The invention assembles clinically proven food-grade nutrients in efficacious doses shown to relieve the symptoms of stress. Specifically, the nutritional supplement comprises low-glycemic-index carbohydrates, protein which includes alpha lactalbumin-enriched protein, fat, caffeine and 5-HTP, in amounts that together work to reduce stress and conditions associated therewith, as discussed below. Carbohydrates from low-glycemic-sources and fiber promote satiety by allowing glucose and insulin to be slowly released into the blood. Increased satiety is beneficial as overeating is a common side effect in stressed individuals. 5-HTP, which is a precursor of serotonin, increases satiety because it increases serotonin production, a hormone which stimulates satiety neurons in the hypothalamus. Caffeine increases mental alertness in a safe and rapid (approximately 30 minutes) manner.

Physiological response to stress is the same regardless of the causation. Under stress, the body releases neurotransmitters (e.g., epinephrine, norepinephrine, serotonin) and cortisol to get the body back to a non-stressed state. In chronic stress, the neurotransmitters can become depleted and as a result, the lack of serotonin is directly related to poor mood and depression. Cortisol, however, does not get depleted and its continued presence in the body depresses mood. Long term exposure to cortisol leads to impaired memory, depressed immune function, central obesity and development of chronic disease. Thus, long term consumption of these ingredients can decrease risk of chronic disease like heart disease and obesity due to long-term exposure to cortisol.

Each serving of the product contains ideally 220 kcal. The protein is preferably alpha lactalbumin-enriched whey protein which is commercially available as PROXIME ALPHA from Borculo Domo Ingredients, Corculo, Netherlands. Alpha lactalbumin-enriched whey protein has been shown to increase serotonin by supplying a rich source of tryptophan, a precursor of serotonin. Stress was shown to be relieved and mood improved within 30 minutes. Cortisol levels were also decreased (Marcus, C. R., et al., *Am. J. Clin. Nutr.,* 71:1536–1544 (2000). Fat is from a non-atherogenic vegetable oil (such as canola, soy, olive), and optionally medium-chain triglycerides, which is oxidized immediately and unable to be stored (Babayan, V. K., *Lipids,* 22:417–20 (1987)).

The nutritional supplement can be made in a variety of forms such as a pharmaceutical composition (e.g., tablet, powder, suspension, liquid, capsule, gel), nutritional beverages, puddings, confections (i.e., candy), ice cream, frozen confections and novelties, or non-baked, extruded food products such as bars, to assist patients with stress management.

The nutritional supplement can be formulated into a snack to be taken as part of the diet or it can be formulated as a meal replacement. For a snack and meal replacement, the nutritional supplement should provide from about 50 to about 400 kcal per serving; from about 100 to about 300 kcal being preferred; and from about 220 kcal being most preferred.

For the purposes of this invention, a preferred nutritional supplement comprises the components described above as a single serving (serving unit), whereby one or a plurality (preferably, two) of these supplement(s) is(are) consumed daily. The proportions of these ingredients are based on an about 60 to about 75 gram serving. The preferred form of administration is a nutritional bar but the supplement could be consumed as a liquid or in tablet form. In a preferred embodiment, each serving (serving size) contains 220 kcal and is comprised of macronutrient percentages in concert with the dietary recommendations of the American Diabetic Association and American Dietary Association. Other serving sizes are contemplated in the invention. The total amount of each ingredient should be appropriately adjusted.

The use levels for ingredients incorporated into the nutritional supplement are illustrated in the chart below and represents broadest, preferred and most preferred embodiments. All ranges are approximate.

| Nutrients (per serving) | Optimal Amount | Preferred Range | Recommended Range |
|---|---|---|---|
| Low-glycemic-index carbohydrate | 20 g total | 10–50 g total | 1–100 g total |
| Protein | 20 g | 10–30 g | 1–100 g |
| Fat | 6.5 g | 3–10 g | 1–50 g |
| Caffeine | 180 mg | 20–250 mg | 1–600 mg |
| 5-hydroxytryptophan | 100 mg | 20–200 mg | 1–900 mg |

The ingredients that make up the nutritional supplement are described in detail below and with regard to their relative role each contributes to therapeutic advantages of the invention.

Low-Glycemic-Index Carbohydrates

An important macronutrient is carbohydrate because it has the greatest influence on satiety and subsequent weight loss. Foods with low-glycemic-indexes evoke a smaller rise in blood glucose and insulin and a higher glucagon concentration, which promote satiety and prevent weight gain better than those carbohydrate-containing foods with higher ones because they take longer to digest and to be absorbed than carbohydrates with high-glycemic-indexes (Expert Panel, National Institute of Health, Heart, Lung, and Blood Institute, 1–42 (June 1998)). The "glycemic index" is a system of predicting subsequent rises in blood glucose after ingestion of carbohydrate-containing foods (Anderson, J. S. et al., *Modern Nutrition in Health and Disease,* ch. 70: 1259–86 (1994); Wolever, T. M. S. et al., *Am. J. Clin. Nutr.,* 54: 846–54 (1991); Wolever, T. M. S. et al., *Diab. Care,* 12: 126–32 (1990)). It is usually defined as the area under the glycemic response curve during a 2-hour period after consumption of 50 g of carbohydrate from a test food divided by the area under the curve of a standard, which is either white bread or glucose. The high-glycemic-index carbohydrates have the highest peak circulating glucose in a 2-hour period following ingestion of food. Conversely, low-glycemic-index carbohydrates cause a lower peak glucose and smaller area under the curve. Many factors determine the glycemic index of foods. They include carbohydrate type (i.e., fiber), protein and fat content, and method of preparation (overcooked foods evoke a higher response) (Ludwig, D. C., *J. Nutr.,* 130:280S–283S (2000); Jenkins, D. J., et al., *Am. J. Clin. Nutr.,* 34:362–366 (1981)). Generally high-glycemic-index carbohydrates are highly refined, have a relatively high amount of glucose from starch, and are low in fructose (found in fruits). By contrast, low-glycemic-index carbohydrates are high in soluble fiber.

Other factors which affect satiety are the amount of carbohydrate, the complexity of the carbohydrate, and the other foods are eaten simultaneously with the carbohydrate (e.g., fiber, protein, fat) (Ludwig, D. S., *J. Nutr.,* 130: 280S–3S (2000); Wolever, T. M. S. et al., *Am. J. Clin. Nutr.,* 54: 846–54 (1991); Wolever, T. M. S. et al, *Diab. Care,* 12: 126–32 (1990)). Bread and potatoes raise blood glucose more than beans. Other foods containing no or non-digestible carbohydrate ingested at the same time as carbohydrates (e.g., fat, fiber, and protein) reduces postprandial blood glucose and insulin levels (Wolever, T. M. S. et al., *Am. J. Clin. Nutr.,* 54: 846–54 (1991)).

Several investigators demonstrated the importance of carbohydrates, and in particular glucose, on mental and physical performance (Dye, L., et al., *Nutrition,* 16:1021–1034 (2000); Gonder-Frederick, L., et al., *Physiology & Behavior,* 41:503–504 (1987)). Carbohydrate provides the most rapidly available source of glucose for the brain's preferred metabolic fuel. Glucose is required for the synthesis of neurotransmitters such as serotonin, norepinephrine, and acetylcholine. The lack of glucose availability noticeably impairs cognitive performance (Dye, L., et al., *Nutrition,* 16:1021–1034 (2000)). It follows that enhancing glucose availability through the ingestion of carbohydrates should reduce impairment and enhance mental performance. In chronic stress, a guaranteed constant supply of glucose seems to be advantageous in improving mental performance. This can be provided by low-glycemic-index carbohydrates.

The hormonal profile created from consumption of low-glycemic-index carbohydrates and fiber is a low glucose and insulin response and a high glucagon response (Expert Panel, National Institute of Health, Heart, Lung, and Blood Institute, 1–42 (June 1998)). Insulin response may be more important than the glycemic response in weight loss, although the two are highly correlated (Holt, S. H. A. et al., *Am. J. Clin. Nutr.,* 661: 1264–76 (1997)). Some foods elicit a greater insulin response than glycemic response. Similarly, eating carbohydrate-rich and protein-rich foods at the same meal increases the postprandial insulin response (Slabber, M. et al., *Am. J. Clin. Nutr.,* 60: 48–53 (1994)).

Patients who also eat a diet rich in low-glycemic-index carboydrates will have the best results (Expert Panel, National Institute of Health, Heart, Lung, and Blood Institute, 1–42 (June 1998)). This diet should include foods rich in vegetables, fruits, and legumes, moderate amounts of protein and healthful fats, and decreased intake of refined grain products, potato, and concentrated sugars.

Based upon this understanding, the nutritional supplement will comprise one or more sources of carbohydrates having a low-glycemic-index and a source of fiber (e.g., fructose, uncooked corn starch, barley (pearled or steel cut), steel cut oats, konjac mannan, psyllium). In a preferred embodiment, the carbohydrate has a low-glycemic-index (e.g., fructose) and provides a source of fiber (e.g., wheat bran, cellulose, oat bran, corn bran, guar, pectin, psyllium) comprising about 2 to about 10 g carbohydrate per serving. Two servings per day are recommended at this use level (e.g., one in the morning as or with breakfast and one in the afternoon as needed).

Fructose is a preferred carbohydrate for sweetening the nutritional supplement. It is sweeter than ordinary table sugar (sucrose), derived from beet or cane sugars, and has a low-glycemic-index (GI=32). Taken as part of a meal, fructose produces a smaller incremental rise in plasma glucose level does sucrose, glucose, potato starch, or wheat starch.

In preferred embodiments, it is desirable to incorporate barley or oats (e.g., steel cut) into the nutritional supplement as a carbohydrate and fiber source. Of all the grains, certain forms of barley have some of the lowest glycemic indexes. Pearled barley (GI=36) and cracked barley (GI=72) have lower glycemic indexes than sweet corn (GI=78), rolled barley (GI=94), and instant white rice (GI=128). Further, it is desirable to use barley with its bran still on it (referred to as "hulless barley"), so that the naturally occurring fiber remains. Thus, it provides a low glycemic source of carbohydrate and a source of fiber (14%), both of which are advantageous in maintaining good glucose and weight control.

Konjac flour, which comes from a perennial tuber called *Amorphophallus konjac,* is a dietary fiber (90%) and a polysaccharide with a very high molecular weight. In addition, this glucomannan hydrocolloid has the ability to increase the viscosity of the intestinal fluid (digesta), thereby limiting the transport of glucose into the bloodstream (Vuksan, V. et al., submitted for publication, (2000)). Konjac mannan also has a low-glycemic-index, promoting weight loss by increasing satiety in obese and non-obese patients with type 2 diabetes (Doi, K. et al., *Progress in Obesity Research,* ch. 80: 507–14, (1990)).

A good source of fiber for use in the invention is psyllium. Psyllium husk fiber is a viscous, mostly water-soluble fiber prepared from blonde psyllium seed (*Plantago ovata*). Psyllium, because it is a dietary fiber, promotes satiety and minimizes weight gain (Ludwig, D. S. et al., *Modern Nutrition in Health and Disease,* ch. 70: 1259–86 (1994)). It also has been shown to reduce blood lipid concentrations and blood glucose levels (Anderson, J. W. et al., *Am. J. Clin. Nutr.,* 70: 466–73 (1999); Anderson, J. W. et al., *Am. J. Clin. Nutr.,* 71: 1433–8 (2000); Anderson, J. W. et al., *Am. J. Clin. Nutr.,* 71: 472–9 (2000)). Psyllium can be added in amounts of from about 1 g to about 10 g per serving based upon a 20–30 g bar serving, and about 10 to about 15 g dry powder beverage mix. Preferably, each serving of the nutritional supplement contains 1 g of psyllium, and two servings are taken daily. This, in conjunction with other soluble fiber consumed through a healthy diet, will contribute to controlling appetite and weight gain.

Alpha Lactalbumin-enriched Whey Protein and other Proteins

Alpha lactalbumin-enriched whey protein is a rich source of tryptophan (6%) and increases the plasma ratio of tryptophan/LNAAs. This change drives the synthesis of serotonin, which is often lacking in chronically stressed individuals. Serotonin improves mood, thereby reducing stress. It also reduces cortisol levels that cause the unpleasant feelings associated with stress.

Sources of protein can be any suitable protein utilized in nutritional formulations and can include whey protein, whey protein concentrate, whey powder, egg, soy protein, soy protein isolate, caseinate (e.g., sodium caseinate, sodium calcium caseinate, calcium caseinate, potassium caseinate), animal and vegetable protein and mixtures thereof.

The preferred protein is alpha lactalbumin-enriched whey protein used alone or in combination with other protein (e.g., whey, casein, soy, milk, egg) and provides about 1 to about 100 g protein per serving. The preferred amount of alpha lactalbumin-enriched whey protein is from about 10 grams to about 30 grams per serving, with about 20 grams per serving being most preferred.

Fats and Oils

Fats and oils suitable for use in the invention include non atherogenic oils, partially hydrogenated vegetable oils, marine oils and oils rich in monounsaturated fatty acids, low in linoleic acid and rich in linolenic acid. Sources of fats can include but are not limited to vegetable oil, (e.g., canola oil, corn oil, soybean oil, sesame seed oil, safflower oil, sunflower oil, evening primrose oil, peanut oil, cottonseed oil, high oleic sunflower oil, rapeseed oil, olive oil), fish oil (e.g., menhaden oil, sardine oil) and mixtures thereof, all of which are examples of long-chain triglycerides. The oils can be used in their natural states; alternatively, structured triglycerides, which can be either randomly re-esterified or specifically re-esterified, can be generated from two or more oils and used as a fat source. Structured triglycerides can contain long-chain triglycerides; medium-chain triglycerides; or both long-chain and medium-chain triglycerides.

In a preferred embodiment, the nutritional supplement includes a fat source containing long-chain triglycerides (e.g., canola oil); in another preferred embodiment, the fat sources are provided in an amount sufficient to delay gastric emptying. The nutritional supplement includes from about 1 to about 50 g fat, with from about 3 grams to about 10 grams being preferred and from about 6.5 being most preferred. Canola (most preferred), soy, olive oil and combinations thereof are preferred.

Caffeine

Caffeine has been shown to improve long-term cognitive performance, mood, and alertness in well-rested and sleep-deprived individuals without side effects (Penetar, D. N., et al., In: Marriott BM (ed.), Food Components to Enhance Performance, Washington, D.C., National Academy Press, pgs. 407–431 (1994); Durlach, P. J., *Psychopharmacology,* 140:116–119 (1998); Neims, A. H. and von Borstel, R. W., In: Wurtman J J (ed.), Nutrition and Brain, New York: Raven Press, pgs. 1–20 (1983)). Small amounts (60 mg) found in a cup of tea or ⅓ of a cup of strong coffee appear to be effective (Cataldo, C. B., et al., *Nutrition & Diet Therapy,* New York: West Publishing Company, p. 64 (1995)). Doses of up to 600 mg per day are deemed safe and effective. Caffeine has its maximum effect within 2 to 4.5 hours and then is almost entirely excreted.

The amount of caffeine incorporated into the nutritional supplement should be that which provides from about 1 mg to about 600 mg caffeine, with from about 20 mg to about 250 mg being preferred. In a preferred embodiment, the amount of caffeine will be about 180 mg per serving.

5 Hydroxythryptophan (5-HTP)

The brain neurotransmitter, serotonin, has an inhibitory effect on eating behavior (Cangiano, C. et al., *Am. J. Clin. Nutr.,* 56: 863–7 (1992)). This neurotransmitter appears to influence both energy balance and the circadian patterns of eating (i.e., three times during the day) by activating satiety neurons in the medial hypothalamus. Serotonin seems to interact antagonistically with norepinephrine, resulting in decreased appetite and carbohydrate consumption. The availability of serotonin is contingent upon the conversion of tryptophan to 5-HTP. Since stressed people are typically lacking in serotonin, this may contribute to overeating. The addition of 5-HTP to the nutritional supplement of the invention serves as a precursor to serotonin. Coupled with the alpha lactalbumin-enriched whey, both should ensure that adequate serotonin is being produced.

5-HTP can be derived from *Griffonia simplicifolia* and made into a 95% pure standardized extract. Although 5-HTP is preferred, tryphtophan can be used.

Each serving of the nutritional supplement contains from about 1 mg to about 900 mg 5-HTP, with from about 20 mg to about 200 mg being preferred, and about 100 mg per serving being most preferred.

Further Ingredients

The nutritional supplement can also contain other ingredients such as one or a combination of other vitamins, minerals, antioxidants, fiber, herbs (e.g., ginkgo biloba, ginseng) and other nutritional supplements. Selection of one or several of these ingredients is a matter of formulation design, consumer and end-user preference. The amount of these ingredients added to the nutritional supplements of this invention are readily known to the skilled artisan and guidance to such amounts can be provided by the RDA and DRI (Dietary Reference Intake) doses for children and adults. Vitamins and minerals that can be added include, but are not limited to, calcium phosphate or acetate, tribasic; potassium phosphate, dibasic; magnesium sulfate or oxide; salt (sodium chloride); potassium chloride or acetate; ascorbic acid; ferric orthophosphate; niacin amide; zinc sulfate or oxide; calcium pantothenate; copper gluconate; riboflavin; beta-carotene; pyridoxine hydrochloride; thiamin mononitrate; folic acid; biotin; chromium chloride or picolinate; potassium iodide; selenium; sodium selenate; sodium molybdate; phylloquinone; Vitamin $D_3$; cyanocobalamin; sodium selenite; copper sulfate; Vitamin A; Vitamin E; vitamin $B_6$ and hydrochloride thereof, Vitamin C; inositol; Vitamin $B_{12}$; potassium iodide.

The amount of other ingredients per unit serving are a matter of design and will depend upon the total number of unit servings of the nutritional supplement daily administered to the patient. The total amount of other ingredients will also depend, in part, upon the condition of the patient. Preferably the amount of other ingredients will be a fraction or multiplier of the RDA or DRI amounts. For example, the nutritional supplement can comprise 50% RDI (Reference Daily Intake) of vitamins and minerals per unit dosage and the patient will consume two units per day.

Flavors, coloring agents, spices, nuts and the like can be incorporated into the product. Flavorings can be in the form of flavored extracts, volatile oils, chocolate flavorings (e.g., non-caffeinated cocoa or chocolate, or chocolate substitutes, such as carob), peanut butter flavoring, cookie crumbs, crisp rice, vanilla or any commercially available flavoring. Flavorings can be protected with mixed tocopherols. Examples of useful flavorings include but are not limited to pure anise extract, imitation banana extract, imitation cherry extract, chocolate extract, pure lemon extract, pure orange extract, pure peppermint extract, imitation pineapple extract, imitation rum extract, imitation strawberry extract, or pure vanilla extract; or volatile oils, such as balm oil, bay oil, bergamot oil, cedarwood oil, cherry oil, walnut oil, cinnamon oil, clove oil, or peppermint oil; peanut butter, chocolate flavoring, vanilla cookie crumb, butterscotch or toffee. In a preferred embodiment, the nutritional supplement contains berry or other fruit flavors. The food compositions may further be coated, for example with a yogurt coating, if it is produced as a bar.

Emulsifiers may be added for stability of the final product. Examples of suitable emulsifiers include, but are not limited to, lecithin (e.g., from egg or soy), and/or mono- and di-glycerides. Other emulsifiers are readily apparent to the skilled artisan and selection of suitable emulsifier(s) will depend, in part, upon the formulation and final product.

Preservatives may also be added to the nutritional supplement to extend product shelf life. Preferably, preservatives such as potassium sorbate, sodium sorbate, potassium benzoate, sodium benzoate or calcium disodium EDTA are used.

In addition to the carbohydrates described above, the nutritional supplement can contain artificial sweeteners, e.g., saccharides, cyclamates, aspartamine, aspartame, acesulfame K, and/or sorbitol. Such artificial sweeteners can be desirable if the nutritional supplement is intended for an overweight or obese individual, or an individual with type II diabetes who is prone to hyperglycemia.

Manufacture of the Nutritional Supplement

The nutritional supplements of the present invention may be formulated using any pharmaceutically acceptable forms of the vitamins, minerals and other nutrients discussed above, including their salts. They may be formulated into capsules, tablets, powders, suspensions, gels or liquids optionally comprising a physiologically acceptable carrier, such as but not limited to water, milk, juice, sodas, starch, vegetable oils, salt solutions, hydroxymethyl cellulose, carbohydrate. In a preferred embodiment, the nutritional supplements may be formulated as powders, for example, for mixing with consumable liquids, such as milk, juice, sodas, water or consumable gels or syrups for mixing into other nutritional liquids or foods. The powdered form has particular consumer appeal, is easy to administer and incorporate into one's daily regimen, thus increasing the chances of patient compliance. The nutritional supplements of this invention may be formulated with other foods or liquids to provide premeasured supplemental foods, such as single serving bars or beverages, for example.

To manufacture such a beverage, the ingredients are dried and made readily soluble in water or other consumable liquids as described above.

To manufacture such a food bar, the dry ingredients are added with the liquid ingredients in a mixer and mixed until the dough phase is reached; the dough is put into an extruder and extruded; the extruded dough is cut into appropriate lengths; and the product is cooled.

For manufacture of other foods or beverages, the ingredients comprising the nutritional supplement of this invention can be added to traditional formulations or they can be used to replace traditional ingredients. Those skilled in food formulating will be able to design appropriate foods/beverages with the objective of this invention in mind.

The nutritional supplement can be made in a variety of forms, such as puddings, confections, (i.e., candy), nutritional beverages, ice cream, frozen confections and novelties, or non-baked, extruded food products such as bars. The preferred form is a powder for a beverage or a non-baked extruded nutritional bar.

In another embodiment, the ingredients can be separately assembled. For example, certain of the ingredients (e.g., the bitter tasting ones) can be assembled into a tablet or capsule using known techniques for their manufacture. The remaining ingredients can be assembled into a powder, liquid or nutritional bar, as described herein. The two assembled forms comprise the nutritional supplement and can be packaged together or separately, such as in the form of a kit, as described below. Further, they can be administered together or separately, as desired.

Use of the Nutritional Supplement for Stress

Several of the complex actions initiated by stress are dependent on a constant supply of certain nutrients. Lack of these nutrients often causes poor adaptation to stress and a failure to return to homeostasis. The most comprehensive work on this subject is the report from the Committee on Military Nutrition Research of the Institute of Medicine in response to the armed forces' request for a list of nutrients that enhance performance during stress (Marriott BM (ed.), Food Components to Enhance Performance, Washington, D.C.: National Academy Press (1994); Committee on Military Nutrition and Research, Conclusions and Recommendations, In: Marriott BM. Food Components to Enhance Performance, Washington, D.C.: National Academy Press, 47–61, 1994)).

The active ingredients in the nutritional supplement, as discussed in detail above, work to relieve stress and alter mood. Caffeine rapidly increases the mental alertness of the individual. 5-HTP, which is a precursor of serotonin, stimulates brain serotonin and causes decreased carbohydrate intake and weight loss. Low-glycemic-index carbohydrates are specifically chosen based on their ability to manage blood glucose levels and increase satiety. Alpha lactalbumin-enriched whey protein can increase serotonin levels while decreasing cortisol levels.

Long-term administration of the nutritional supplement of the invention may aid in the reduction of health risks associated with chronic stress, such as diminished mental and physical performance, dampened immune function, depression, hyperlididemia, cardiovascular disease, hypertension, obesity and diabetes. Regulation of serotonin and cortisol levels using the nutritional supplement of the invention may be instrumental in reducing some of these side effects of stress.

The composition and dietary supplements of the invention are intended to be orally administered daily. Based on the serving size of about 60 grams to about 75 grams per serving, the recommended dosage is twice daily. For example, if the supplement is in the form of a food bar or beverage, then the patient would consume one in the morning (preferably as a breakfast meal replacement or with breakfast) and one mid- to late afternoon, preferably to modulate stress and mood which can be impaired by foods consumed at lunch. The recommended daily amounts of each ingredient, as described above, serve as a guideline for formulating the dietary supplements of this invention. The actual amount of each ingredient per unit dosage will depend upon the number of units daily administered to the individual in need thereof. This is a matter of product design and is well within the skill of the dietary supplement formulator.

The ingredients can be administered in a single formulation or they can be separately administered. For example, it may be desirable to administer the bitter tasting ingredients in a form that masks their taste (e.g., capsule or pill form) rather than incorporating them into the nutritional composition itself (e.g., powder or bar). Thus, the invention also provides a pharmaceutical pack or kit comprising one or more containers filled with one or more of the ingredients of the nutritional compositions of the invention (e.g., nutritional supplement in the form of a powder and capsules containing green tea and caffeine). Optionally associated with such container(s) can be a notice in the form prescribed by a government agency regulating the manufacture, use or sale of pharmaceutical or dietary supplement products, which notice reflects approval by the agency of manufacture, use of sale for human administration. The pack or kit can be labeled with information regarding mode of administration, sequence of administration (e.g., separately, sequentially or concurrently), or the like. The pack or kit may also include means for reminding the patient to take the therapy. The pack or kit can be a single unit dosage of the combination therapy or it can be a plurality of unit dosages. In particular, the agents can be separated, mixed together in any combination, present in a formulation or tablet. Agents assembled in a blister pack or other dispensing means is preferred.

All references provided herein are incorporated by reference in their entirety.

EXAMPLIFICATION

Nutritional Supplement for Management of Stress

In one embodiment, the nutritional supplement is a nutritional bar that provides about 219 kcal/unit serving, where one unit serving is about 60 to about 75 grams. The bar is to be administered twice daily. The nutritional supplement has the following characteristics:

- approximately 20 grams low-glycemic-index carbohydrate;
- approximately 20 grams alpha lactalbumin-enriched whey protein (Borculo Domo Ingredients, Borculo, Netherlands);
- approximately 120 mg caffeine;
- approximately 20 mg to 200 mg 5-hydroxytryptophan; and
- approximately 6.5 grams fat: canola, soy, olive or combinations thereof.

While this invention has been particularly shown and described with references to preferred embodiments thereof, it will be understood by those skilled in the art that various changes in form and details may be made therein without departing from the scope of the invention encompassed by the appended claims.

What is claimed is:

1. A nutritional supplement for management of symptomology associated with stress resulting from serotonin-deficient disorders in an individual in need thereof, comprising a low-glycemic-index carbohydrate, protein comprising alpha lactalbumin-enriched whey protein, fat, caffeine and 5-hydroxytryptophan (5-HTP), in amounts effective to manage symptomology associated with stress resulting from serotonin-deficient disorders.

2. The nutritional supplement of claim 1, wherein the nutritional supplement is in the form of an extruded bar.

3. The nutritional supplement of claim 1, wherein the nutritional supplement is in the form of a powder.

4. The nutritional supplement of claim 1, wherein the carbohydrate source further provides a source of fiber.

5. The nutritional supplement of claim 1, wherein the carbohydrate source is selected from the group consisting of fructose, barlEy, steel cut oats, oat bran, soy, psyllium and combinations thereof.

6. The nutritional supplement of claim 1, wherein the protein is alpha lactalbumin-enriched whey protein.

7. The nutritional supplement of claim 1, wherein fat is a non-atherogenic oil, partially hydrogenated oil or combinations thereof.

8. The nutritional supplement of claim 7, wherein the non-atherogenic oil is vegetable oil.

9. The nutritional supplement of claim 8 wherein the vegetable oil is selected from the group consisting of: canola, olive, soy, safflower, sunflower, corn and combinations thereof.

10. A nutritional supplement comprising, from about 1 to about 100 grams low-glycemic-index carbohydrate, from about 1 to about 100 grams alpha lactalbumin-enriched whey protein, from about 1 to about 50 grams fat, from about 1 mg to about 600 milligrams caffeine and from about 1 to about 900 milligrams 5-hydroxytryptophan, in amounts that work together to manage symptomology associated with stress resulting from serotonin-deficient disorders.

11. A nutritional supplement comprising, from about 10 to about 50 grams low-glycemic-index carbohydrate, from about 10 to about 30 grams alpha lactalbumin-enriched whey protein, from about 3 to about 10 grams fat, from about 20 to about 200 milligrams caffeine and from about 20 to about 200 milligrams 5-hydroxytryptophan, in amounts that work together to manage symptomology associated with stress resulting from serotonin-deficient disorders.

12. A food or beverage comprising the nutritional supplement of claim 1.

13. A pharmaceutical composition comprising the nutritional supplement of claim 1 in a physiologically acceptable carrier.

14. A kit comprising:

a) one or more ingredients comprising the nutritional supplement of claim 1 provided in a capsule or tablet; and b) the remaining ingredients of the nutritional supplement provided as a powder or nutritional bar.

15. The nutritional supplement of claim 1, wherein the ingredients are separately assembled.

16. The nutritional supplement of claim 1, wherein the carbohydrate is a low-glycemic-index carbohydrate grain.

17. The nutritional supplement of claim 7, wherein the non-atherogenic oil is fish oil.

18. A nutritional supplementation that aids in the relief of symptomology associated with stress resulting from serotonin-deficient disorders, comprising administering to an individual in need thereof a nutritional supplement comprising, from about 1 to about 100 grams low-glycemic-index carbohydrate, from about 1 to about 100 grams alpha lactalbumin-enriched whey protein, from about 1 to about 50 grams fat, and from about 1 mg to about 600 milligrams caffeine, in amounts that together work to manage conditions associated with stress resulting from serotonin-deficient disorders.

19. The method of claim 18, wherein the nutritional supplement further comprises from about 1 to about 900 milligrams 5-hydroxytryptophan (5-HTP).

* * * * *

UNITED STATES PATENT AND TRADEMARK OFFICE

CERTIFICATE OF CORRECTION

PATENT NO. : 6,743,770 B2
DATED : June 1, 2004
INVENTOR(S) : Stacey J. Bell and Judith Shabert It is certified that error appears in the above-identified patent and that said Letters Patent is hereby corrected as shown below:

Column 10,
Line 42, delete "barlEy" and insert -- barley --.
Line 61, delete "that work together" and insert -- effective --.

Column 11,
Line 2, delete "that work together" and insert -- effective --.

Column 12,
Line 11, delete "that work together" and insert -- effective --.

Signed and Sealed this

Seventh Day of September, 2004

JON W. DUDAS
*Acting Director of the United States Patent and Trademark Office*